United States Patent
Shi et al.

(10) Patent No.: US 12,016,029 B2
(45) Date of Patent: Jun. 18, 2024

(54) METHOD, APPARATUS AND TERMINAL FOR DETERMINING NUMBER OF TIMES OF BLIND INSPECTIONS

(71) Applicant: GUANGDONG OPPO MOBILE TELECOMMUNICATIONS CORP., LTD., Guangdong (CN)

(72) Inventors: Cong Shi, Dongguan (CN); Shukun Wang, Dongguan (CN); Jia Shen, Dongguan (CN); Zhenshan Zhao, Dongguan (CN); Zhihua Shi, Dongguan (CN); Huei-Ming Lin, South Yarra (AU)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 535 days.

(21) Appl. No.: 17/244,339

(22) Filed: Apr. 29, 2021

(65) Prior Publication Data

US 2021/0250978 A1 Aug. 12, 2021

Related U.S. Application Data

(63) Continuation of application No. PCT/CN2018/112796, filed on Oct. 30, 2018.

(51) Int. Cl.
*H04W 72/23* (2023.01)
*H04L 1/00* (2006.01)
*H04W 72/0453* (2023.01)
*H04W 72/1268* (2023.01)

(52) U.S. Cl.
CPC ....... *H04W 72/23* (2023.01); *H04W 72/0453* (2013.01); *H04W 72/1268* (2013.01); *H04L 1/0038* (2013.01)

(58) Field of Classification Search
CPC ............ H04W 72/23; H04W 72/0453; H04W 71/1268; H04L 1/0038
USPC ................ 370/329, 328, 338, 341, 345, 350
See application file for complete search history.

(56) References Cited

FOREIGN PATENT DOCUMENTS

| CN | 103139819 A | 6/2013 |
|----|-------------|--------|
| EP | 2490495 A1  | 8/2012 |
| EP | 3247061 A1  | 11/2017 |

OTHER PUBLICATIONS

Zhou Hua WO 2018014297 A1 Information Transmission Device and Method, and Wireless Communication System Jan. 25, 2018.*
Yang, Suckchel WO 2014081241 A1 Method for Transceiving Control Signal, and Apparatus Therefor May 30, 2014.*
The international search report of PCT application No. PCT/CN2018/112796, dated Jul. 25, 2019.

(Continued)

*Primary Examiner* — Nghi H Ly
(74) *Attorney, Agent, or Firm* — Ladas & Parry, LLP (57) ABSTRACT

Embodiments of the present application provide a method, an apparatus and a terminal for determining the number of times of blind detections, which includes: blind-detecting, by a terminal, a downlink control channel in a first search space of a first cell, where the downlink control channel is configured to schedule a second cell, and the number of times of blind detections of the downlink control channel are determined based on configuration information of a second search space of the second cell and/or configuration information of the first search space of the first cell.

20 Claims, 7 Drawing Sheets

(56) References Cited

OTHER PUBLICATIONS

OPPO; "Remaining issues on Search Space"; 3GPP TSG RAN WG1 Meeting #92, R1-1802115; Athens, Greece, Feb. 26-Mar. 2, 2018; (Mar. 2, 2018), entire document.
MediaTek Inc.; "Remaining Issues on Search Space"; 3GPP TSG RAN WG1 Meeting #93, R1-1806779; Busan, Korea, May 21-25, 2018; (May 25, 2018), entire document.
Vivo; "Remaining issues on PDCCH"; 3GPP TSG RAN WG1 Meeting #94, R1-1808224; Gothenburg, Sweden, Aug. 20-24, 2018; (Aug. 24, 2018), entire document.
Written Opinion of the International Searching Authority in PCT application No. PCT/CN2018/112796, dated Jul. 25, 2019 with English translation provided by Google Translate.
The EESR of corresponding European application No. 18938364.9, dated Oct. 28, 2021.
Samsung:"Remaining issues on PDCCH and Search Space Design", 3GPP Draft; R1-1808753, 3rd Generation Partnership Project (3GPP), Mobile Competence Centre; 650, Route Des Lucioles; F-06921 Sophia-Antipolis Cedex; France, Aug. 24, 2018(Aug. 24, 2018), XP051516126, entire document.
Huawei et al:"Remaining issues on search space", 3GPP Draft; R1-1805881, 3rd Generation Partnership Project (3GPP), Mobile Competence Centre; 650, Route Des Lucioles; F-06921 Sophia-Antipolis Cedex; France, vol. RAN WG1, No. Busan, Korea; May 21, 2018-May 25, 2018 May 20, 2018(May 20, 2018), XP051441101, entire document.

* cited by examiner

FIG. 1

A terminal blind-detects a downlink control channel in a first search space of a first cell, where the downlink control channel is configured to schedule a second cell, and the number of times of blind detections of the downlink control channel are determined based on configuration information of a second search space of the second cell and/or configuration information of the first search space of the first cell

METHOD, APPARATUS AND TERMINAL FOR DETERMINING NUMBER OF TIMES OF BLIND INSPECTIONS

CROSS-REFERENCE TO RELATED APPLICATIONS

This application is a continuation of International Application No. PCT/CN2018/112796 filed on Oct. 30, 2018, the content of which is incorporated herein by reference in its entirety.

TECHNICAL FIELD

Embodiments of the present application relate to the field of mobile communication technologies, and in particular, to a method, an apparatus and a terminal for determining the number of times of blind detections.

BACKGROUND

In a terminal that support cross-carrier scheduling, a network configures a cross carrier scheduling configuration (CrossCarrierSchedulingConfig) on each serving cell to support whether the terminal is self-scheduled in the serving cell or is scheduled by another cell. However, the current configuration manner can only allow the terminal to adopt the same number of times of blind detections for all scheduling cells and scheduled cells for a certain aggregation level, but cannot achieve that different cells have different number of times of blind detections.

SUMMARY

Embodiments of the present application provide a method, an apparatus and a terminal for determining the number of times of blind detections.

A method for determining the number of times of blind detections according to the embodiments of the present application includes:
blind-detecting, by a terminal, a downlink control channel in a first search space of a first cell, where the downlink control channel is configured to schedule a second cell, and the number of times of blind detections of the downlink control channel are determined based on configuration information of a second search space of the second cell and/or configuration information of the first search space of the first cell.

An apparatus for determining the number of times of blind detections according to the embodiments of the present application includes:
a blind detecting unit, configured to blind-detect a downlink control channel in a first search space of a first cell, where the downlink control channel is configured to schedule a second cell, and the number of times of blind detections of the downlink control channel are determined based on configuration information of a second search space of the second cell and/or configuration information of the first search space of the first cell.

A terminal according to the embodiments of the present application includes a processor and a memory. The memory is configured to store a computer program, the processor is configured to call and run the computer program stored in the memory to execute the above method for determining the number of times of blind detections.

A chip according to the embodiments of the present application is configured to implement the above method for determining the number of times of blind detections.

Specifically, the chip includes: a processor, configured to call and run a computer program from a memory to enable a device installed with the chip to execute the method for determining the number of times of blind detections.

A computer-readable storage medium according to the embodiments of the present application is configured to store a computer program that enables a computer to execute the above method for determining the number of times of blind detections.

A computer program product according to the embodiments of the present application includes a computer program instruction that enables a computer to execute the above method for determining the number of times of blind detections.

A computer program according to the embodiments of the present application, when run on a computer, enables the computer to execute the above method for determining the number of times of blind detections.

Through the above technical solutions, it is achieved that different cells have different number of times of blind detections in the cross-carrier scheduling, that is, the scheduling cell and the scheduled cell are not limited to having the same number of times of blind detections, and the blind detection manner is more flexible.

BRIEF DESCRIPTION OF DRAWINGS

The accompanying drawings described herein are used to provide a further understanding of the present application and constitute a part of the present application. The exemplary embodiments and descriptions thereof are used to explain the present application, and do not constitute an improper limitation of the present application. In the accompanying drawings.

DESCRIPTION OF EMBODIMENTS

Technical solutions in embodiments of the present application will be described below in combination with the accompanying drawings in the embodiments of the present application. Apparently, the described embodiments are merely a part rather than all embodiments of the present application. All other embodiments obtained by persons of ordinary skill in the art based on embodiments of the present application without creative effort shall fall within the protection scope of the present disclosure.

The technical solutions of the embodiments of the present application can be applied to various communication systems, such as: Global System of Mobile communication (GSM) system, Code Division Multiple Access (CDMA) system, Wideband Code Division Multiple Access (WCDMA) system, General Packet Radio Service (GPRS) system, Long Term Evolution (LTE) system, LTE Frequency Division Duplex (FDD) system, LTE Time Division Duplex (TDD) system, Universal Mobile Telecommunication System (UMTS), Worldwide Interoperability for Microwave Access (WiMAX) communication system or 5G system, etc.

Figure 1:
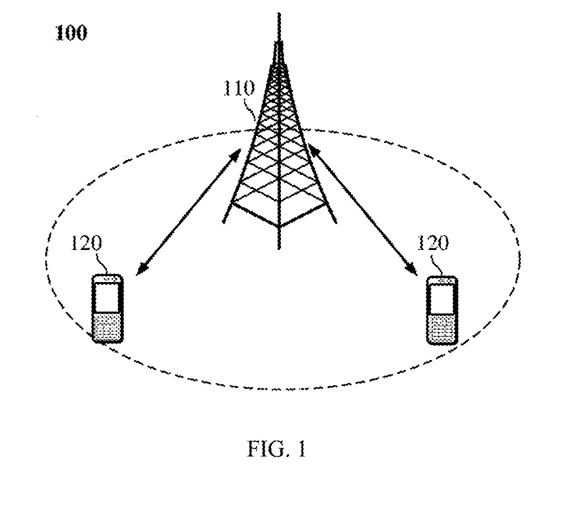
FIG. 1 is a schematic diagram of a communication system architecture according to an embodiment of the present application.

Exemplarily, a communication system 100 applied in an embodiment of the present application is shown in FIG. 1. The communication system 100 may include a network device 110, and the network device 110 may be a device that communicates with a terminal 120 (or referred to as a communication terminal or a terminal). The network device 110 may provide communication coverage for a specific geographic area, and may communicate with a terminal located in the coverage area. In an embodiment, the network device 110 may be a Base Transceiver Station (BTS) in a GSM system or a CDMA system, or a NodeB (NB) in a WCDMA system, or an Evolutional Node B (eNB or eNodeB) in an LTE system, or a wireless controller in a Cloud Radio Access Network (CRAN), or the network device may be a mobile switching center, a relay station, an access point, an in-vehicle device, a wearable device, a hub, a switch, a network bridge, a router, a network-side device in a 5G network or a network device in a future evolved Public Land Mobile Network (PLMN), etc.

The communication system 100 further includes at least one terminal 120 located within a coverage area of the network device 110. The "terminal" used herein includes, but is not limited to, a connection via a wired line, such as a device that connects via a Public Switched Telephone Network (PSTN), a Digital Subscriber Line (DSL), a digital cable, and a direct cable; and/or a device that connects via another network; and/or via a wireless interface, for example, a device that connects via with respect to a cellular network, a Wireless Local Area Network (WLAN), a digital television network such as Digital Video Broadcasting Handheld (DVB-H) network, a satellite network, an Amplitude Modulation Frequency Modulation (AM-FM) broadcast transmitter; and/or via an apparatus that is set to receive/send communication signals of another terminal; and/or an Internet of Things (IoT) device. A terminal that is set to communicate through a wireless interface may be referred to as a "wireless communication terminal", a "wireless terminal" or a "mobile terminal". Examples of a mobile terminal include, but are not limited to, a satellite or a cellular phone; a Personal Communications System (PCS) terminal that can combine a cellular radio phone with data processing, fax, and data communication functions; a PDA that can include a radio phone, a pager, Internet/Intranet access, a web browser, a notepad, a calendar, and/or a Global Positioning System (GPS) receiver; and a conventional knee and/or palmtop receivers or others electronic apparatuses including radio telephone transceivers. The terminal can refer to an access terminal, a User Equipment (UE), a user unit, a user station, a mobile station, a mobile platform, a remote station, a remote terminal, a mobile device, a user terminal, a terminal, a wireless communication device, a user agent, or a user apparatus. The access terminal can be a cellular phone, a cordless phone, a Session Initiation Protocol (SIP) phone, a Wireless Local Loop (WLL) station, a Personal Digital Assistant (PDA), a handheld device with wireless communication functions, a computing device or other processing devices connected to a wireless modem, an in-vehicle device, a wearable device, a terminal in a 5G network or a terminal in a future evolved PLMN, etc.

In an embodiment, Device to Device (D2D) communication may be performed between the terminals 120.

In an embodiment, the 5G system or 5G network may also be referred to as a New Radio (NR) system or a NR network.

FIG. 1 exemplarily shows one network device and two terminals. In an embodiment, the communication system 100 may include a plurality of network devices, and a coverage of each network device may include other numbers of terminals, which is not limited in the embodiments of the present application.

In an embodiment, the communication system 100 may also include other network entities such as a network controller and a mobility management entity, which is not limited in the embodiments of the present application.

It should be understood that devices with communication functions in the network/system in the embodiments of the present application may be referred to as communication devices. Taking the communication system 100 shown in FIG. 1 as an example, the communication device may include the network device 110 and the terminal 120 with communication functions, and the network device 110 and the terminal 120 may be the specific devices described above, which will not be repeated herein. The communication device may further include other devices in the communication system 100, such as other network entities, for example a network controller and a mobility management entity, which are not limited in the embodiments of the present application.

It should be understood that the terms "system" and "network" herein are often used interchangeably. The term "and/or" herein is merely an association relationship describing associated objects, and indicates that there may be three relationships. For example, A and/or B may indicate: presence of A only, of both A and B, and of B only. In addition, the character "/" herein generally indicates an "or" relationship between contextual objects.

In order to facilitate the understanding of the technical solutions of the embodiments of the present application, the following describes relevant technologies involved in the embodiments of the present application.

In a terminal that support cross-carrier scheduling, a network configures a CrossCarrierSchedulingConfig on each serving cell to support whether the terminal is self-scheduled in the serving cell or is scheduled by another cell.

If the serving cell is self-scheduled, the terminal detects a Physical Downlink Control Channel (PDCCH) in a search space configured on the current serving cell; if the serving cell is cross-carrier scheduled, the terminal detects the PDCCH in a search space configured on a scheduling cell (which refers to a cell which schedules the current serving cell).

In related arts, a terminal that supports the cross-carrier scheduling determine the number of times of PDCCH blind detections corresponding to each scheduled cell in a search space of a scheduling cell in the following manners: in a search space configuration structure, each search space can be configured with different aggregation levels, and different aggregation levels correspond to one number of times of blind detections. This configuration manner allows the terminal to adopt the same number of times of blind detections for all scheduling cells and scheduled cells for a certain aggregation level, but cannot achieve that different cells have different number of times of blind detections. For example, there is one scheduling cell and two scheduled cells (scheduled cell1 and scheduled cell2). It is assumed that there are 32 Control Channel Elements (CCEs) in a search space configured on the scheduling cell, and it is assumed that an aggregation level is 2, it is desired to blind-detect the scheduling cell for 2 times, the scheduled cell1 for 3 time, and the scheduled cell2 for 4 times. A current signaling configuration cannot meet this requirement. On the other hand, in a search space configuration, a serving cell can be configured with a plurality of Band Width Parts (BWP), and each BWP can be configured with at most 3 control resource sets (CORESETs) and 10 search spaces. The embodiments of the present application can achieve that different cells have different number of times of blind detections in the cross-carrier scheduling.

Figure 2:
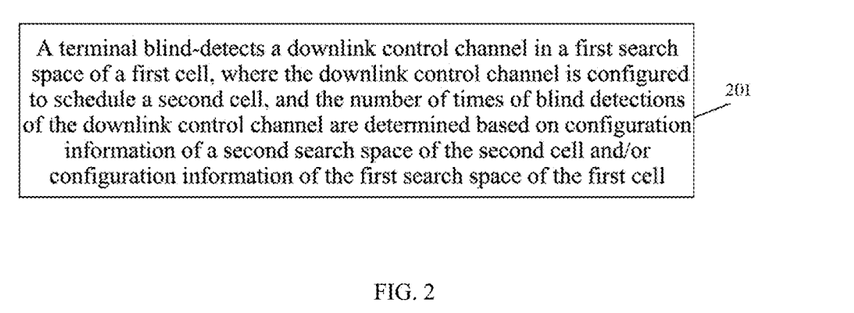
FIG. 2 is a schematic flowchart of a method for determining the number of times of blind detections according to an embodiment of the present application.

FIG. 2 is a schematic flowchart of a method for determining the number of times of blind detections according to an embodiment of the present application. As shown in FIG. 2, the method for determining the number of times of blind detections includes the following steps:

Step 201: A terminal blind-detects a downlink control channel in a first search space of a first cell, where the downlink control channel is configured to schedule a second cell, and the number of times of blind detections of the downlink control channel are determined based on configuration information of a second search space of the second cell and/or configuration information of the first search space of the first cell.

In an embodiment of the present application, the terminal can be any device capable of communicating with a network, such as a mobile phone, an in-vehicle terminal, a tablet computer, a notebook, a wearable device, and the like.

In the embodiment of the present application, description of the first cell can also be replaced with a first carrier, and description of the second cell can also be replaced with a second carrier. In the cross-carrier scheduling, the first cell is a scheduling cell (that is, a scheduling carrier), and the second cell is a scheduled cell (that is, a scheduled carrier). When implementing the cross-carrier scheduling, the terminal blind-detects the downlink control channel in the first search space of the first cell, and the downlink control channel is configured to schedule the second cell.

For example, cell 1 is a scheduling cell, cell 2 is a scheduled cell, and a PDCCH on cell 1 schedules uplink data and/or downlink data on cell 2; in order to receive data on cell 2, a terminal needs to obtain PDCCH from cell 1, so as to determine information such as time-frequency resources of data on cell 2 based on the PDCCH.

In an embodiment of the present application, the downlink control channel (such as PDCCH) scheduling the second cell is transmitted in the first search space of the first cell, and the number of times of blind detections for the downlink control channel scheduling the second cell (referred to as the number of times of blind detections of the second cell) is determined based on the configuration information of the second search space of the second cell and/or the configuration information of the first search space of the first cell. The following describes when the number of times of blind detections of the second cell is determined based on the configuration information of the second search space of the second cell, and when it is determined based on the configuration information of the first search space of the first cell.

The terminal reports first indication information to the network, where the first indication information is used to indicate whether the terminal supports cross-carrier scheduling and configuration that different carriers have different number of times of blind detections in the cross-carrier scheduling. 1) If the first indication information indicates that the terminal supports the cross-carrier scheduling and the configuration that different carriers have different number of times of blind detections in the cross-carrier scheduling, the terminal determines the number of times of blind detections of the downlink control channel based on the configuration information of the second search space of the second cell. 2) If the first indication information indicates that the terminal does not support the cross-carrier scheduling and the configuration that different carriers have different number of times of blind detections in the cross-carrier scheduling, the terminal determines the number of times of blind detections of the downlink control channel based on the configuration information of the first search space of the first cell.

In the above solution, the first indication information may be a display indication or an implicit indication.

In an implementation (display indication), the first indication information is UE capability information of the terminal, and the UE capability information of the terminal indicates whether the terminal supports the cross-carrier scheduling and the configuration that different carriers have different number of times of blind detections in the cross-carrier scheduling.

In another implementation (implicit indication), the first indication information is Access Stratum (AS) version information of the terminal, and the AS version information of the terminal is used for the network to determine whether the terminal supports the cross-carrier scheduling and the configuration that different carriers have different number of times of blind detections in the cross-carrier scheduling. For example, an AS version of the terminal being R15 means that the terminal does not support the cross-carrier scheduling and the configuration that different carriers have different number of times of blind detections in the cross-carrier scheduling; the AS version of the terminal being R16 means that the terminal supports the cross-carrier scheduling and the configuration that different carriers have different number of times of blind detections in the cross-carrier scheduling.

In the above solution, the first cell is configured with at least one BWP, each BWP is configured with at least one search space, each search space is configured with at least one aggregation level, and each aggregation level corresponds to one number of times of blind detections. Similarly, for the terminal that support the cross-carrier scheduling, the second cell is configured with at least one BWP, each BWP is configured with at least one search space, each search space is configured with at least one aggregation level, and each aggregation level corresponds to one number of times of blind detections.

For example, the first cell is configured with 3 BWPs, namely BWP1, BWP2, and BWP3, where BWP1 is an active BWP. Each of the three BWPs is configured with at least one search space. Taking BWP1 as an example, a first search space is configured on BWP1, and a configuration of the first search space includes the following information: search space identifier (SearchSpaceId) of the first search space, control resource set identifier (ControlResourceSetId) of a first control resource set associated with the first search space, and time domain information (period information, starting position information in a period) of the first search space. In addition, the configuration of the first search space further includes the following information: one or more aggregation levels, where each aggregation level corresponds to one number of times of blind detections. BWP configuration and search space configuration on the second cell are the same as those of the first cell.

Based on this, when the terminal blind-detects the downlink control channel scheduling the second cell on the first search space of the first cell, the number of times of blind detections for the downlink control channel is determined based on the number of times of blind detections in the configuration information of the second search space of the second cell. In other words, PDCCH blind detection space configuration of the second cell is obtained by replacing aggregation level of the first search space of the first cell and relevant configuration of the corresponding number of times of blind detections with aggregation level of the second search space of the second cell and relevant configuration of the corresponding number of times of blind detections. It should be noted that the number of times of blind detections is with respect to a specific aggregation level, for example, the number of times of blind detections for aggregation level 1 is N1, and the number of times of blind detections for aggregation level 2 is N2.

Figure 3A:
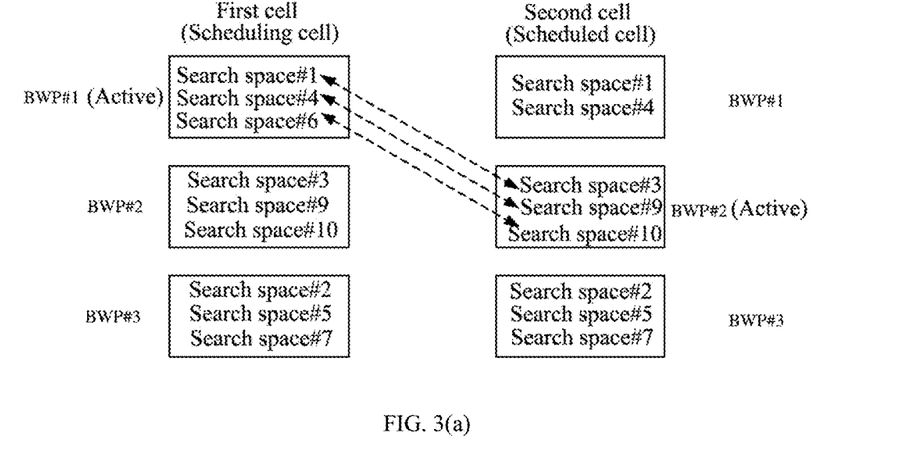
FIG. 3(a) is a first schematic diagram of a corresponding relationship between search spaces according to an embodiment of the present application.

In an embodiment of the present application, the first search space is a search space on a current active BWP of the first cell, and the second search space is a search space on a current active BWP of the second cell. There is a corresponding relationship between the first search space and the second search space. That is, there is a corresponding relationship between an identifier of the first search space and an identifier of the second search space. Further, the corresponding relationship between the first search space and the second search space is determined by one of the following manners:

Manner 1: mapping a search space on the current active BWP of the second cell to a search space on the current active BWP of the first cell according to an ascending order of identifiers.

The number of search spaces on the current active BWP of the first cell is greater than or equal to the number of search spaces on the current active BWP of the second cell, so that the second search space of the second cell can uniquely map to the first search space of the first cell.

For example, referring to FIG. 3(a), the first cell is configured with 3 BWPs, namely BWP #1, BWP #2 and BWP #3, where the BWP #1 is a current active BWP, and the second cell is also configured with 3 BWPs, where BWP #2 is a current active BWP. The active BWP #1 of the first cell is configured with 3 search spaces, namely search space #1, search space #4 and search space #6; and the active BWP #2 of the second cell is configured with 3 search spaces, namely search space #3, search space #9 and search space #10. According to an ascending order of identifiers, the search space #3 on the BWP #2 of the second cell maps to the search space #1 on the BWP #1 of the first cell, the search space #9 on the BWP #2 of the second cell maps to the search space #4 on the BWP #1 of the first cell, and the search space #10 on the BWP #2 of the second cell maps to the search space #6 on the BWP #1 of the first cell.

Based on this, taking the second search space as the search space #3 on the BWP #2 of the second cell as an example, when the terminal blind-detects a PDCCH scheduling the second cell on the search space #1 on the BWP #1 of the first cell, the number of times of blind detections of the PDCCH is the number of times of blind detections configured on the search space #3 on the BWP #2 of the second cell, and other search space configuration information corresponding to the PDCCH still uses configuration of the search space #1 on BWP #1 of the first cell.

Figure 3B:
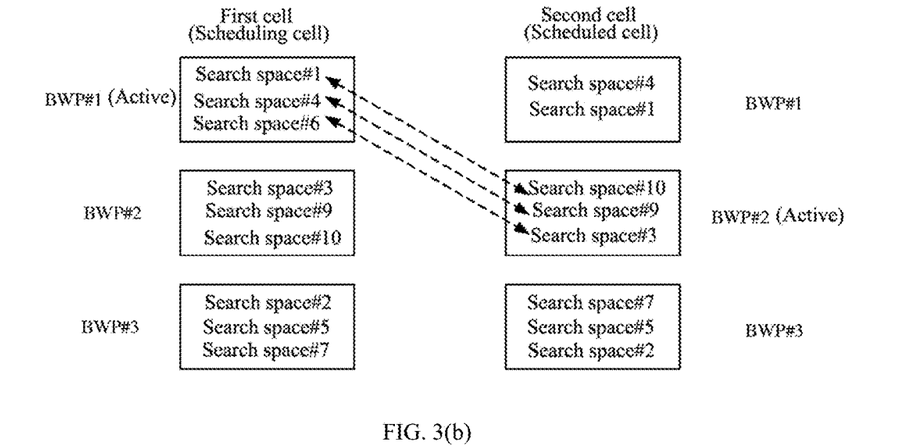
FIG. 3(b) is a second schematic diagram of a corresponding relationship between search spaces according to an embodiment of the present application.

Manner 2: mapping the search space on the current active BWP of the second cell to the search space on the current active BWP of the first cell according to a descending order of the identifiers.

The number of search spaces on the current active BWP of the first cell is greater than or equal to the number of search spaces on the current active BWP of the second cell, so that the second search space of the second cell can uniquely map to the first search space of the first cell.

For example, referring to FIG. 3(b), the first cell is configured with 3 BWPs, namely BWP #1, BWP #2 and BWP #3, where the BWP #1 is a current active BWP, and the second cell is also configured with 3 BWPs, where BWP #2 is a current active BWP. The active BWP #1 of the first cell is configured with 3 search spaces, namely search space #1, search space #4 and search space #6; and the active BWP #2 of the second cell is configured with 3 search spaces, namely search space #10, search space #9 and search space #3. According to a descending order of identifiers, the search space #10 on the BWP #2 of the second cell maps to the search space #1 on the BWP #1 of the first cell, the search space #9 on the BWP #2 of the second cell maps to the search space #4 on the BWP #1 of the first cell, and the search space #3 on the BWP #2 of the second cell maps to the search space #6 on the BWP #1 of the first cell.

Based on this, taking the second search space as the search space #10 on the BWP #2 of the second cell as an example, when the terminal blind-detects a PDCCH scheduling the second cell on the search space #1 on the BWP #1 of the first cell, the number of times of blind detections of the PDCCH is the number of times of blind detections configured on the search space #10 on the BWP #2 of the second cell, and other search space configuration information corresponding to the PDCCH still uses configuration of the search space #1 on BWP #1 of the first cell.

Figure 3C:
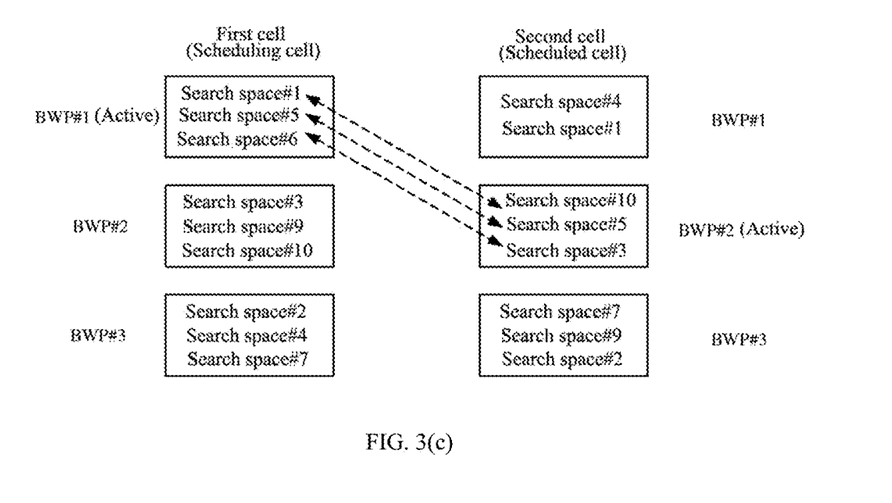
FIG. 3(c) is a third schematic diagram of a corresponding relationship between search spaces according to an embodiment of the present application.

Manner 3: mapping the search space on the current active BWP of the second cell to the search space on the current active BWP of the first cell according to a result of modulo operation on the identifiers.

The number of search spaces on the current active BWP of the first cell is greater than or equal to the number of search spaces on the current active BWP of the second cell, so that the second search space of the second cell can uniquely map to the first search space of the first cell.

For example, referring to FIG. 3(c), the first cell is configured with 3 BWPs, namely BWP #1, BWP #2 and BWP #3, where the BWP #1 is a current active BWP, and the second cell is also configured with 3 BWPs, where BWP #2 is a current active BWP. The active BWP #1 of the first cell is configured with 3 search spaces, namely search space #1, search space #5 and search space #6; and the active BWP #2 of the second cell is configured with 3 search spaces, namely search space #10, search space #5 and search space #3. According to a result of modulo operation on 3, the search space #10 on the BWP #2 of the second cell maps to the search space #1 on the BWP #1 of the first cell (the result of the modulo operation on 3 is 1), the search space #5 on the BWP #2 of the second cell maps to the search space #5 on the BWP #1 of the first cell (the result of the modulo operation on 3 is 2), and the search space #3 on the BWP #2 of the second cell maps to the search space #6 on the BWP #1 of the first cell (the result of the modulo operation on 3 is 0).

Based on this, taking the second search space as the search space #10 on the BWP #2 of the second cell as an example, when the terminal blind-detects a PDCCH scheduling the second cell on the search space #1 on the BWP #1 of the first cell, the number of times of blind detections of the PDCCH is the number of times of blind detections configured on the search space #10 on the BWP #2 of the second cell, and other search space configuration information corresponding to the PDCCH still uses configuration of the search space #1 on BWP #1 of the first cell.

Figure 3D:
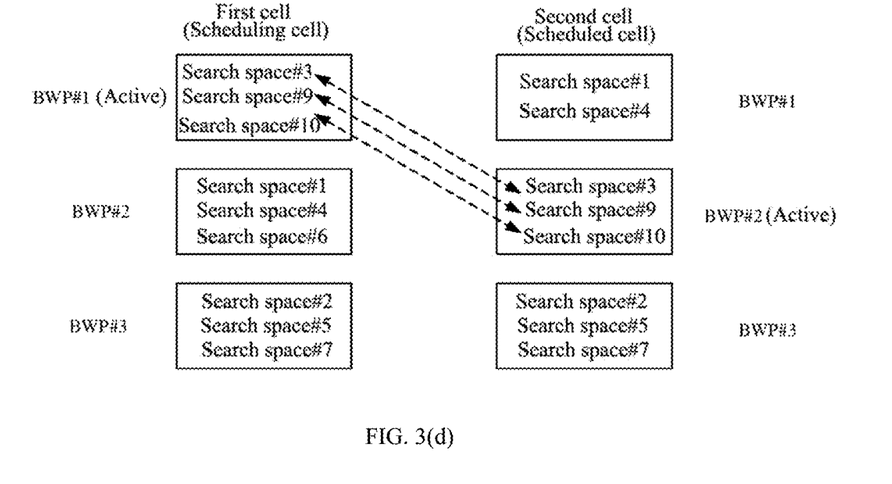
FIG. 3(d) is a fourth schematic diagram of a corresponding relationship between search spaces according to an embodiment of the present application.

Manner 4: mapping the search space on the current active BWP of the second cell to the search space on the current active BWP of the first cell when whether their identifiers are the same.

The number of search spaces on the current active BWP of the first cell is greater than or equal to the number of search spaces on the current active BWP of the second cell, so that the second search space of the second cell can uniquely map to the first search space of the first cell.

For example, referring to FIG. 3(*d*), the first cell is configured with 3 BWPs, namely BWP #1, BWP #2 and BWP #3, where the BWP #1 is a current active BWP, and the second cell is also configured with 3 BWPs, where BWP #2 is a current active BWP. The active BWP #1 of the first cell is configured with 3 search spaces, namely search space #3, search space #9 and search space #10; and the active BWP #2 of the second cell is configured with 3 search spaces, namely search space #3, search space #9 and search space #10. According to a corresponding of identifiers being the same, the search space #3 on the BWP #2 of the second cell maps to the search space #3 on the BWP #1 of the first cell, the search space #9 on the BWP #2 of the second cell maps to the search space #9 on the BWP #1 of the first cell, and the search space #10 on the BWP #2 of the second cell maps to the search space #10 on the BWP #1 of the first cell.

Based on this, taking the second search space as the search space #3 on the BWP #2 of the second cell as an example, when the terminal blind-detects a PDCCH scheduling the second cell on the search space #3 on the BWP #1 of the first cell, the number of times of blind detections of the PDCCH is the number of times of blind detections configured on the search space #3 on the BWP #2 of the second cell, and other search space configuration information corresponding to the PDCCH still uses configuration of the search space #3 on BWP #1 of the first cell.

Manner 5: mapping the search space on the current active BWP of the second cell to the search space on the current active BWP of the first cell according to an identifier corresponding relationship of network configuration.

The number of search spaces on the current active BWP of the first cell is greater than or equal to the number of search spaces on the current active BWP of the second cell, so that the second search space of the second cell can uniquely map to the first search space of the first cell.

Here, the network may pre-configure a corresponding relationship between search spaces of the first cell and the second cell, and the terminal directly determines the corresponding relationship between the first search space and the second search space according to the corresponding relationship.

Figure 3E:
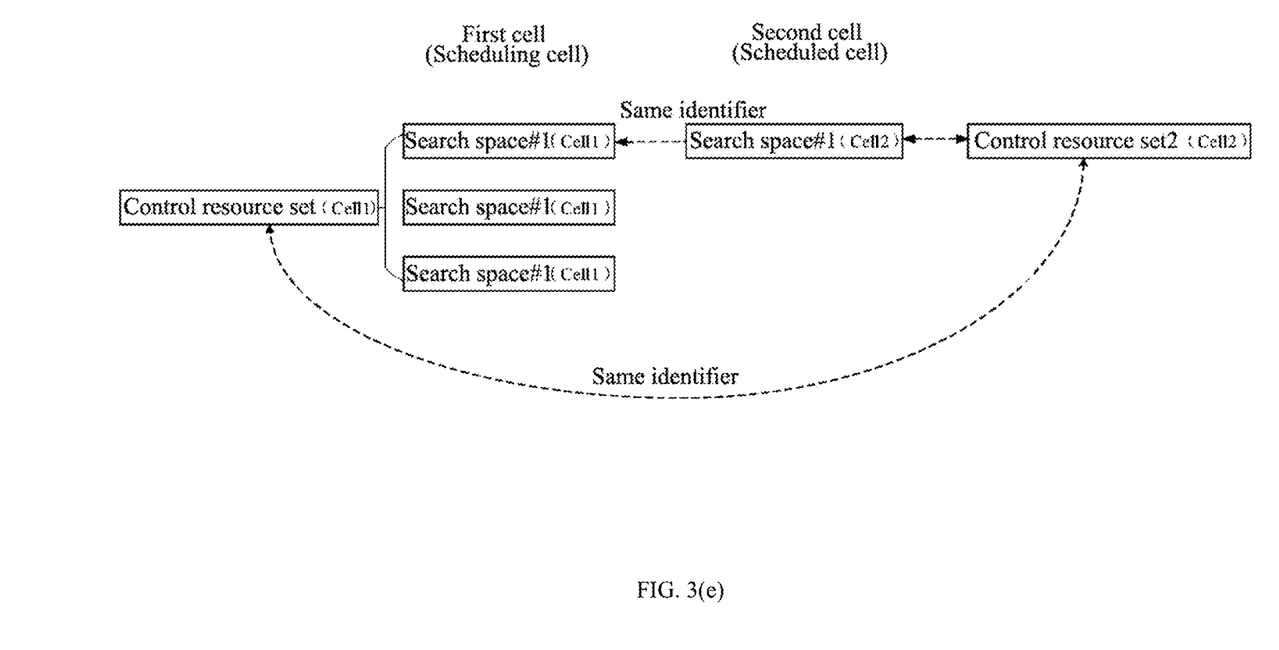
FIG. 3(e) is a fifth schematic diagram of a corresponding relationship between search spaces according to an embodiment of the present application.
Figure 3F:
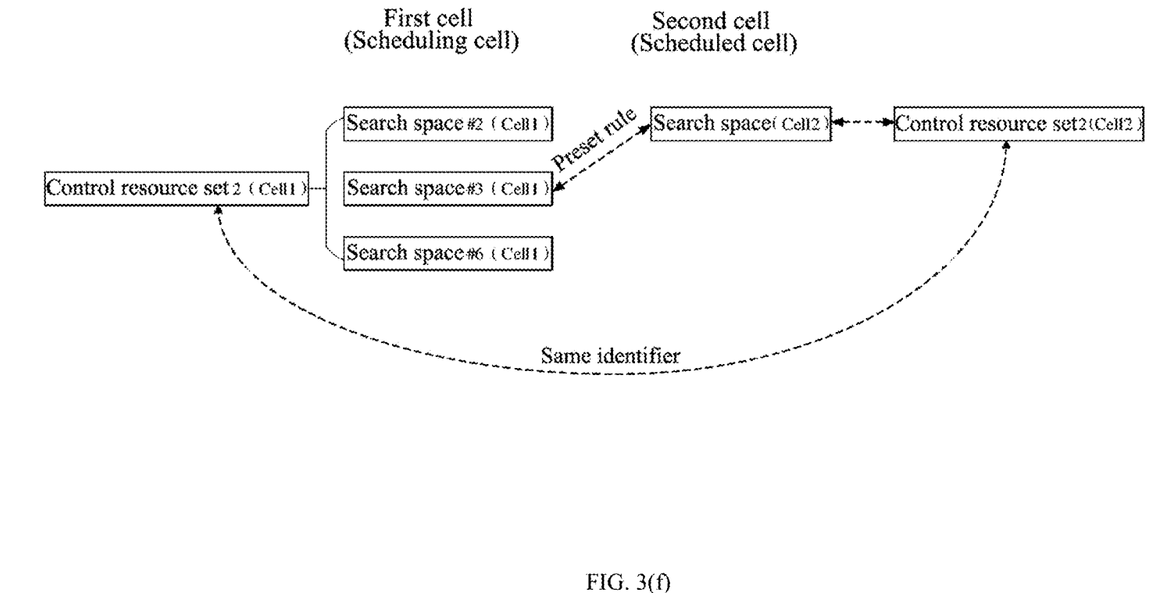
FIG. 3(f) is a sixth schematic diagram of a corresponding relationship between search spaces according to an embodiment of the present application.

Manner 6: mapping a first control resource set corresponding to the search spaces on the current active BWP of the second cell to a second control resource set on the current active BWP of the first cell, where the first control resource set and the second control resource set have the same identifier, where an identifier of the search space on the current active BWP of the second cell is at least the same as an identifier of a search space associated with the second control resource set; or at least one parameter of the search space on the current active BWP of the second cell is applied to at least one search space associated with the second control resource set.

For example, referring to FIGS. 3(*e*) and 3(*f*), search space #1 (Cell2) is a search space on a current active BWP of a second cell, and a control resource set associated with the search space #1 (Cell2) is control resource set 2 (Cell2), and the control resource set 2 (Cell2) maps to control resource set 2 (Cell1) of the first cell. Further, 1) if a search space #1 (Cell1) is in a search space associated with the control resource set 2 (Cell1), the search space #1 (Cell2) maps to the search space #1 (Cell1), referring to FIG. 3 (*e*). Or, 2) if no search space #1 (Cell1) is in the search space associated with the control resource set 2 (Cell1), the search space #1 (Cell2) maps to a search space #3 (Cell1) according to a preset rule, where the search space #3 (Cell1) is associated with the control resource set 2 (Cell1), referring to FIG. 3(*f*).

Based on this, when the terminal blind-detects a PDCCH scheduling the second cell on the search space #1 (Cell1) or the search space #3 (Cell1), the number of times of blind detections of the PDCCH is the number of times of blind detections configured on the search space #1 (Cell2), and other search space configuration information corresponding to the PDCCH still uses configuration of the search space #1 (Cell1) or the search space #3 (Cell1).

In an embodiment of the present application, the first search space is a search space on a current active BWP of the first cell, and the second search space is a search space on an inactive BWP of the second cell. There is a corresponding relationship between the first search space and the second search space. That is, there is a corresponding relationship between an identifier of the first search space and an identifier of the second search space. Further, the first search space and the second search space have the same identifier.

For example, the first cell is configured with 3 BWPs, namely BWP #1, BWP #2 and BWP #3, where the BWP #1 is a current active BWP, and the second cell is also configured with 3 BWPs, where BWP #2 is a current active BWP. The active BWP #1 of the first cell is configured with 3 search spaces, namely search space #1, search space #2 and search space #3; and the active BWP #2 of the second cell is configured with 2 search spaces, namely search space #4 and search space #5. It is assumed that the first search space is the search space #2 on the active BWP #1 of the first cell, since the active BWP #2 of the second cell there does not have a search space having the same identifier as the search space #2, the terminal will find a search space on an inactive BWP of the second cell having the same identifier as the search space #2 on the active BWP #1 of the first cell. It assumed that there is a search space #2 on the inactive BWP #1 of the second cell, the terminal replaces relevant parameters (aggregation level and the corresponding number of times of blind detections) of search space #2 on the active BWP #1 of the first cell with relevant parameters (aggregation level and the corresponding number of times of blind detections) of search space #2 on the inactive BWP #1 of the second cell.

It should be noted that in the technical solution of the embodiment of the present application, the number of second cells scheduled by the first cell is one or more. When the number of the second cells scheduled by the first cell is more than one, the number of times of PDCCH blind detections corresponding to different second cells may be different, so as to achieve that different cells have different number of times of blind detections in the cross-carrier scheduling.

Figure 4:
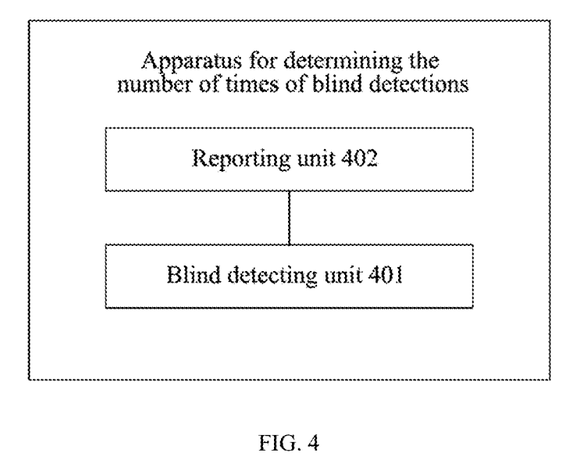
FIG. 4 is a schematic diagram of a structural composition of an apparatus for determining the number of times of blind detections according to an embodiment of the present application.

FIG. 4 is a schematic diagram of a structural composition of an apparatus for determining the number of times of blind detections according to an embodiment of the present application. As shown in FIG. 4, the apparatus includes:

a blind detecting unit 401, configured to blind-detect a downlink control channel in a first search space of a first cell, where the downlink control channel is configured to schedule a second cell, and the number of times of blind detections of the downlink control channel are determined based on configuration information of a second search space of the second cell and/or configuration information of the first search space of the first cell.

In an implementation, the first search space is a search space on a current active BWP of the first cell, and the second search space is a search space on a current active BWP of the second cell; and where there is a corresponding relationship between the first search space and the second search space.

In an implementation, the corresponding relationship between the first search space and the second search space is determined by the following manners: mapping a search space on the current active BWP of the second cell to a search space on the current active BWP of the first cell according to an ascending order of identifiers; or, mapping the search space on the current active BWP of the second cell to the search space on the current active BWP of the first cell according to a descending order of the identifiers; or, mapping the search space on the current active BWP of the second cell to the search space on the current active BWP of the first cell according to a result of modulo operation on the identifiers; or, mapping the search space on the current active BWP of the second cell to the search space on the current active BWP of the first cell when whether their identifiers are the same; or, mapping the search space on the current active BWP of the second cell to the search space on the current active BWP of the first cell according to an identifier corresponding relationship of network configuration.

In an implementation, the number of search spaces on the current active BWP of the first cell is greater than or equal to the number of search spaces on the current active BWP of the second cell.

In an implementation, the corresponding relationship between the first search space and the second search space is determined by the following manner:

mapping a first control resource set corresponding to search spaces on the current active BWP of the second cell to a second control resource set on the current active BWP of the first cell, where the first control resource set and the second control resource set have the same identifier;

where an identifier of the search space on the current active BWP of the second cell is at least the same as an identifier of a search space associated with the second control resource set; or, at least one parameter of the search space on the current active BWP of the second cell is applied to at least one search space associated with the second control resource set.

In an implementation, the apparatus further includes: a reporting unit 402, configured to report first indication information to the network, where the first indication information is used to indicate whether a terminal supports cross-carrier scheduling and configuration that different carriers have different number of times of blind detections in the cross-carrier scheduling.

In an implementation, the first indication information is UE capability information of the terminal, and the UE capability information of the terminal indicates whether the terminal supports the cross-carrier scheduling and the configuration that different carriers have different number of times of blind detections in the cross-carrier scheduling.

In an implementation, the first indication information is AS version information of the terminal, and the AS version information of the terminal is used for the network to determine whether the terminal supports the cross-carrier scheduling and the configuration that different carriers have different number of times of blind detections in the cross-carrier scheduling.

In an implementation, when the first indication information indicates that the terminal supports the cross-carrier scheduling and the configuration that different carriers have different number of times of blind detections in the cross-carrier scheduling, the blind detecting unit 401 determines the number of times of blind detections of the downlink control channel based on the configuration information of the second search space of the second cell.

In an implementation, the second cell is configured with at least one BWP, each BWP is configured with at least one search space, each search space is configured with at least one aggregation level, and each aggregation level corresponds to one number of times of blind detections.

In an implementation, when the first indication information indicates that the terminal does not support the cross-carrier scheduling and the configuration that different carriers have different number of times of blind detections in the cross-carrier scheduling, the blind detecting unit 401 determines the number of times of blind detections of the downlink control channel based on the configuration information of the first search space of the first cell.

In an implementation, the first cell is configured with at least one BWP, each BWP is configured with at least one search space, each search space is configured with at least one aggregation level, and each aggregation level corresponds to one number of times of blind detections.

Those skilled in the art should understand that relevant description of the above apparatus for determining the number of times of blind detections in the embodiment of the present application can be understood with reference to the relevant description of the method for determining the number of times of blind detections in the embodiment of the present application.

Figure 5:
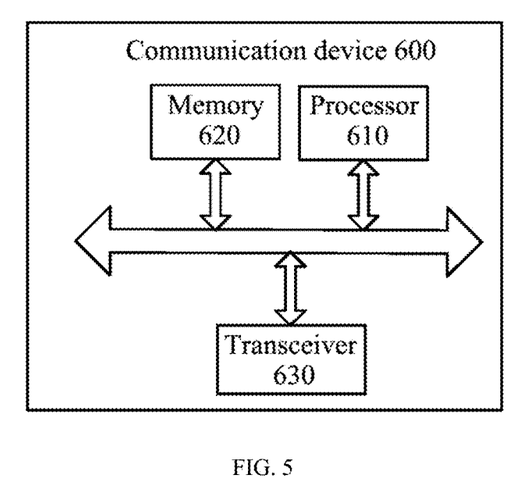
FIG. 5 is a schematic structural diagram of a communication device according to an embodiment of the present application.

FIG. 5 is a schematic block diagram of a communication device 600 according to an embodiment of the present application. The communication device may be a terminal.

The communication device 600 shown in FIG. 5 includes a processor 610, where the processor 610 may call and run a computer program from a memory to implement the method in the embodiment of the present application.

In an embodiment, as shown in FIG. 5, the communication device 600 may further include a memory 620. The processor 610 may call and run a computer program from the memory 620 to implement the method in the embodiment of the present application.

The memory 620 may be a separate device independent of the processor 610, or may be integrated in the processor 610.

In an embodiment, as shown in FIG. 5, the communication device 600 may further include a transceiver 630, and the processor 610 may control the transceiver 630 to communicate with other devices. Specifically, it may send information or data to other devices, or receive information or data sent by other devices.

The transceiver 630 may include a transmitter and a receiver. The transceiver 630 may further include an antenna, and the number of the antenna may be one or more.

In an embodiment, the communication device 600 may specifically be the network device in the embodiment of the present application, and the communication device 600 may implement the corresponding process implemented by the network device in each method of the embodiment of the present application. For the sake of brevity, details are not repeated here.

In an embodiment, the communication device 600 may specifically be the mobile terminal/terminal in the embodiment of the present application, and the communication device 600 may implement the corresponding process implemented by the mobile terminal/terminal in each method of the embodiment of the present application. For the sake of brevity, details are not repeated here.

Figure 6:
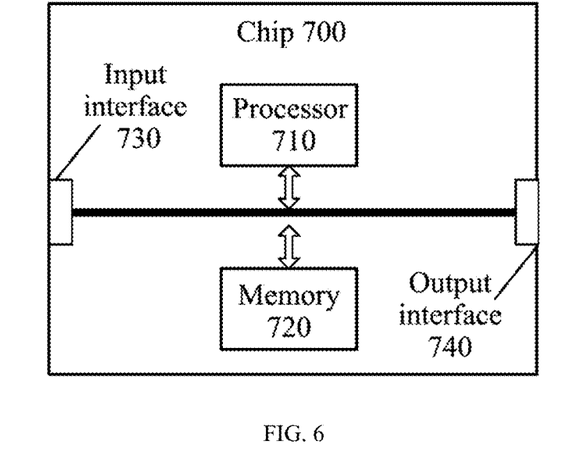
FIG. 6 is a schematic structural diagram of a chip according to an embodiment of the present application.

FIG. 6 is a schematic block diagram of a chip according to an embodiment of the present application. The chip 700 shown in FIG. 6 includes a processor 710, where the processor 710 can call and run a computer program from a memory to implement the method in the embodiment of the present application.

In an embodiment, as shown in FIG. 6, the chip 700 may further include a memory 720. The processor 710 may call and run a computer program from the memory 720 to implement the method in the embodiment of the present application.

The memory 720 may be a separate device independent of the processor 710, or may be integrated in the processor 710.

In an embodiment, the chip 700 may further include an input interface 730. The processor 710 can control the input interface 730 to communicate with other devices or chips. Specifically, it can acquire information or data sent by other devices or chips.

In an embodiment, the chip 700 may further include an output interface 740. The processor 710 can control the output interface 740 to communicate with other devices or chips. Specifically, it can output information or data to other devices or chips.

In an embodiment, the chip can be applied to the network device in the embodiment of the present application, and the chip can implement the corresponding process implemented by the network device in each method of the embodiment of the present application. For the sake of brevity, details are not repeated here.

In an embodiment, the chip can be applied to the mobile terminal/terminal in the embodiment of the present application, and the chip can implement the corresponding process implemented by the mobile terminal/terminal in each method of the embodiment of the present application. For the sake of brevity, details are not repeated here.

It should be understood that the chip mentioned in the embodiment of the present application may also be referred to as a system-level chip, a system chip, a chip system, or a system-on-chip, etc.

Figure 7:
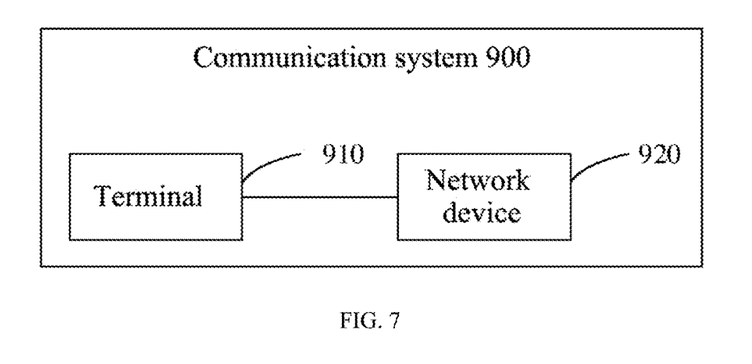
FIG. 7 is a schematic block diagram of a communication system according to an embodiment of the present application.

FIG. 7 is a schematic block diagram of a communication system 900 according to an embodiment of the present application. As shown in FIG. 7, the communication system 900 includes a terminal 910 and a network device 920.

The terminal 910 can be configured to implement the corresponding functions implemented by the terminal in the above method, and the network device 920 can be configured to the implement corresponding functions implemented by the network device in the above method. For the sake of brevity, details are not repeated here.

It should be understood that the processor in the embodiments of the present application may be an integrated circuit chip with a signal processing function. In an implementation process, the steps of the above method embodiments can be completed by hardware integrated logic circuits in the processor or instructions in a form of software. The above processor can be a general-purpose processor, a Digital Signal Processor (DSP), an Application Specific Integrated Circuit (ASIC), a Field Programmable Gate Array (FPGA) or other programming logic devices, discrete gates or transistor logic devices, discrete hardware components. The methods, steps, and logical block diagrams disclosed in the embodiments of the present application can be implemented or executed. The general-purpose processor may be a microprocessor or the processor may also be any conventional processor or the like. The steps of the method disclosed in the embodiments of the present application may be directly embodied as being executed and completed by a hardware decoding processor, or executed and completed by a combination of hardware in the decoding processor and software modules. The software module can be located in a mature storage medium in the field such as random-access memory, flash memory, read-only memory, programmable read-only memory, or electrically erasable programmable memory, registers and the like. The storage medium is located in the memory, and the processor reads the information in the memory and completes the steps of the above method in combination with hardware thereof.

It could be understood that the memory in the embodiments of the present application may be a volatile memory or a non-volatile memory, or may include both volatile and non-volatile memories. The non-volatile memory can be a Read-Only Memory (ROM), a Programmable ROM (PROM), an Erasable PROM (EPROM), an Electrically EPROM (EEPROM) or flash memory. The volatile memory may be a Random Access Memory (RAM), which is used as an external cache. By way of exemplary but not restrictive description, many forms of RAMs are available, such as Static RAM (SRAM), Dynamic RAM (DRAM), Synchronous DRAM (SDRAM), Double Data Rate SDRAM (DDR SDRAM), Enhanced SDRAM (ESDRAM), Synch Link DRAM (SLDRAM) and Direct Rambus RAM (DR RAM). It should be noted that the memories of the systems and methods described herein are intended to include, but are not limited to, these and any other suitable types of memories.

It should be understood that the above memory is exemplary but not restrictive description. For example, the memory in the embodiments of the present application may further be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM) and a Direct Rambus RAM (DR RAM) and the like. That is to say, the memory in the embodiments of the present application is intended to include but not limited to these and any other suitable types of memory.

The embodiments of the present application further provide a computer-readable storage medium which is configured to store a computer program.

In an embodiment, the computer-readable storage medium may be applied to the network device in the embodiments of the present application, and the computer program enables the computer to execute the corresponding process implemented by the network device in each method of the embodiments of the present application. For the sake of brevity, details are not repeated here.

In an embodiment, the computer-readable storage medium may be applied to the mobile terminal/terminal in the embodiments of the present application, and the computer program enables the computer to execute the corresponding process implemented by the mobile terminal/terminal in each method of the embodiments of the present application. For the sake of brevity, details are not repeated here.

The embodiments of the present application further provide a computer program product, including a computer program instruction. In an embodiment, the computer program product can be applied to the network device in the embodiments of the present application, and the computer program instruction enables the computer to execute the corresponding process implemented by the network device in each method of the embodiments of the present application. For the sake of brevity, details are not repeated here. In an embodiment, the computer program product can be applied to the mobile terminal/terminal in the embodiments of the present application, and the computer program instruction enables the computer to execute the corresponding process implemented by the mobile terminal/terminal in each method of the embodiments of the present application. For the sake of brevity, details are not repeated here.

The embodiments of the present application further provide a computer program.

In an embodiment, the computer program can be applied to the network device in the embodiments of the present application. When the computer program is run on the computer, it enables the computer to execute the corresponding process implemented by the network device in each method of the embodiments of the present application. For the sake of brevity, details are not repeated here.

In an embodiment, the computer program can be applied to the mobile terminal/terminal in the embodiments of the present application. When the computer program is run on a computer, it enables the computer to execute the corresponding process implemented by the mobile terminal/terminal in each method of the embodiments of the present application. For the sake of brevity, details are not repeated here.

Those skilled in the art will appreciate that the elements and algorithm steps of the examples described in conjunction with the embodiments disclosed herein can be implemented in electronic hardware or a combination of computer software and electronic hardware. Whether these functions are performed in hardware or software, it depends on specific applications and design constraints of the technical solution. A person skilled in the art may use different methods to implement the described functions with respect to each particular application, but such implementation should not be considered to go beyond the scope of the present application.

Those skilled in the art can clearly understand that, for convenience and brevity of the description, reference may be made to the corresponding processes in the above method embodiments for specific operation processes of the systems, the apparatuses and the units described above, and details will not be described herein again.

In the embodiments provided in the present application, it should be understood that the disclosed systems, apparatuses, and methods may be implemented in other manners. For example, the apparatus embodiments described above are merely illustrative. For example, the division of the units is only a logical function division. In an actual implementation, there may be another division manner. For example, multiple units or components may be combined or may be integrated into another system, or some features may be ignored or not executed. In addition, a coupling or direct coupling or communication connection shown or discussed may be an indirect coupling or communication connection through some interfaces, apparatuses or units, and may be electrical, mechanical or otherwise.

The units described as separate components may or may not be physically separated, and the components shown as units may or may not be physical units, that is, may be located in one place, or may be distributed to multiple network units. Some or all of the units may be selected according to actual needs to achieve the purpose of the solution of the embodiments.

In addition, the functional units in the embodiments of the present application may be integrated into one processing unit, or each of the units may exist alone physically, or two or more units may be integrated in one unit.

The functions may be stored in a computer readable storage medium if implemented in the form of a software functional unit and sold or used as a standalone product. Based on such understanding, the essence of the technical solution of the present application, or a part of the technical solution of the present application contributing to the prior art, or a part of the technical solution may be embodied in the form of a software product which is stored in a storage medium, including instructions for enabling a computer device (which may be a personal computer, a server, or the network device, etc.) to perform all or part of the steps of the methods described in the embodiments of the present application. The above storage medium includes: various mediums capable of storing program codes, such as a USB flash disk, a mobile hard disk, a Read-Only Memory (ROM), a Random Access Memory (RAM), a magnetic disk, an optical disk, or the like.

The above description is only specific embodiments of the present application, but the protection scope of the present application is not limited thereto. Any modification or substitution conceived by persons skilled in the art within the technical scope of the present application should be covered in the protection scope of the present application. Therefore, the protection scope of the present application is subject to the protection scope of the appended claims.

What is claimed is:

1. A method for determining a number of times of blind detections, comprising:
blind-detecting, by a terminal, a downlink control channel in a first search space of a first cell, wherein the downlink control channel is configured to schedule a second cell, and a number of times of blind detections of the downlink control channel are determined according to first indication information based on configuration information of a second search space of the second cell or configuration information of the first search space of the first cell, wherein the first indication information is used to indicate whether the terminal supports cross-carrier scheduling and whether the terminal supports configuration that different carriers have different number of times of blind detections in the cross-carrier scheduling.

2. The method according to claim 1, wherein the first search space is a search space on a current active bandwidth part (BWP) of the first cell, and the second search space is a search space on a current active BWP of the second cell; and wherein there is a corresponding relationship between the first search space and the second search space.

3. The method according to claim 2, wherein the corresponding relationship between the first search space and the second search space is determined by the following manners:

mapping a search space on the current active BWP of the second cell to a search space on the current active BWP of the first cell according to an ascending order of identifiers; or, mapping the search space on the current active BWP of the second cell to the search space on the current active BWP of the first cell according to a descending order of the identifiers; or, mapping the search space on the current active BWP of the second cell to the search space on the current active BWP of the first cell according to a result of modulo operation on the identifiers; or, mapping the search space on the current active BWP of the second cell to the search space on the current active BWP of the first cell when whether their identifiers are the same; or, mapping the search space on the current active BWP of the second cell to the search space on the current active BWP of the first cell according to an identifier corresponding relationship of network configuration.

4. The method according to claim 2, wherein a number of search spaces on the current active BWP of the first cell is greater than or equal to the number of search spaces on the current active BWP of the second cell.

5. The method according to claim 2, wherein the corresponding relationship between the first search space and the second search space is determined by the following manner:

mapping a first control resource set corresponding to the search spaces on the current active BWP of the second cell to a second control resource set on the current active BWP of the first cell, wherein the first control resource set and the second control resource set have the same identifier;

wherein an identifier of the search space on the current active BWP of the second cell is at least the same as an identifier of a search space associated with the second control resource set; or, at least one parameter of the search space on the current active BWP of the second cell is applied to at least one search space associated with the second control resource set.

6. The method according to claim 1, further comprising: reporting, by the terminal, the first indication information to the network.

7. The method according to claim 6, wherein the first indication information is user equipment (UE) capability information of the terminal, and the UE capability information of the terminal indicates whether the terminal supports the cross-carrier scheduling and the configuration that different carriers have different number of times of blind detections in the cross-carrier scheduling; or wherein the first indication information is access stratum (AS) version information of the terminal, and the AS version information of the terminal is used for the network to determine whether the terminal supports the cross-carrier scheduling and the configuration that different carriers have different number of times of blind detections in the cross-carrier scheduling.

8. The method according to claim 6, wherein when the first indication information indicates that the terminal supports the cross-carrier scheduling and the configuration that different carriers have different number of times of blind detections in the cross-carrier scheduling, determining, by the terminal, the number of times of blind detections of the downlink control channel based on the configuration information of the second search space of the second cell;

wherein the second cell is configured with at least one BWP, each BWP is configured with at least one search space, each search space is configured with at least one aggregation level, and each aggregation level corresponds to one number of times of blind detections.

9. The method according to claim 6, wherein when the first indication information indicates that the terminal does not support the cross-carrier scheduling and the configuration that different carriers have different number of times of blind detections in the cross-carrier scheduling, determining, by the terminal, the number of times of blind detections of the downlink control channel based on the configuration information of the first search space of the first cell.

10. The method according to claim 9, wherein the first cell is configured with at least one BWP, each BWP is configured with at least one search space, each search space is configured with at least one aggregation level, and each aggregation level corresponds to one number of times of blind detections.

11. An apparatus for determining a number of times of blind detections, comprising:

a processor and a memory, wherein the memory is configured to store a computer program, the processor when executing the computer program, being configured to:

blind-detect a downlink control channel in a first search space of a first cell, wherein the downlink control channel is configured to schedule a second cell, and a number of times of blind detections of the downlink control channel are determined according to first indication information based on configuration information of a second search space of the second cell or configuration information of the first search space of the first cell, wherein the first indication information is used to indicate whether the terminal supports cross-carrier scheduling and whether the terminal supports configuration that different carriers have different number of times of blind detections in the cross-carrier scheduling.

12. The apparatus according to claim 11, wherein the first search space is a search space on a current active bandwidth part (BWP) of the first cell, and the second search space is a search space on a current active BWP of the second cell; and wherein there is a corresponding relationship between the first search space and the second search space.

13. The apparatus according to claim 12, wherein the corresponding relationship between the first search space and the second search space is determined by the following manners:
    mapping a search space on the current active BWP of the second cell to a search space on the current active BWP of the first cell according to an ascending order of identifiers; or,
    mapping the search space on the current active BWP of the second cell to the search space on the current active BWP of the first cell according to a descending order of the identifiers; or,
    mapping the search space on the current active BWP of the second cell to the search space on the current active BWP of the first cell according to a result of modulo operation on the identifiers; or,
    mapping the search space on the current active BWP of the second cell to the search space on the current active BWP of the first cell when whether their identifiers are the same; or,
    mapping the search space on the current active BWP of the second cell to the search space on the current active BWP of the first cell according to an identifier corresponding relationship of network configuration.

14. The apparatus according to claim 12, wherein a number of search spaces on the current active BWP of the first cell is greater than or equal to the number of search spaces on the current active BWP of the second cell.

15. The apparatus according to claim 12, wherein the corresponding relationship between the first search space and the second search space is determined by the following manner:
    mapping a first control resource set corresponding to search spaces on the current active BWP of the second cell to a second control resource set on the current active BWP of the first cell, wherein the first control resource set and the second control resource set have the same identifier;
    wherein an identifier of the search space on the current active BWP of the second cell is at least the same as an identifier of a search space associated with the second control resource set; or, at least one parameter of the search space on the current active BWP of the second cell is applied to at least one search space associated with the second control resource set.

16. The apparatus according to claim 11, further comprising: a transceiver,
    wherein the processor is configured to control the transceiver to report the first indication information to the network.

17. The apparatus according to claim 16, wherein the first indication information is user equipment (UE) capability information of the terminal, and the UE capability information of the terminal indicates whether the terminal supports the cross-carrier scheduling and the configuration that different carriers have different number of times of blind detections in the cross-carrier scheduling; or
    wherein the first indication information is access stratum (AS) version information of the terminal, and the AS version information of the terminal is used for the network to determine whether the terminal supports the cross-carrier scheduling and the configuration that different carriers have different number of times of blind detections in the cross-carrier scheduling.

18. The apparatus according to claim 16, wherein when the first indication information indicates that the terminal supports the cross-carrier scheduling and the configuration that different carriers have different number of times of blind detections in the cross-carrier scheduling,
    the processor is configured to determine the number of times of blind detections of the downlink control channel based on the configuration information of the second search space of the second cell;
    wherein the second cell is configured with at least one BWP, each BWP is configured with at least one search space, each search space is configured with at least one aggregation level, and each aggregation level corresponds to one number of times of blind detections.

19. The apparatus according to claim 16, wherein when the first indication information indicates that the terminal does not support the cross-carrier scheduling and the configuration that different carriers have different number of times of blind detections in the cross-carrier scheduling,
    the processor is configured to determine the number of times of blind detections of the downlink control channel based on the configuration information of the first search space of the first cell.

20. The apparatus according to claim 19, wherein the first cell is configured with at least one BWP, each BWP is configured with at least one search space, each search space is configured with at least one aggregation level, and each aggregation level corresponds to one number of times of blind detections.

* * * * *